(12) United States Patent
Lundberg et al.

(10) Patent No.: US 8,591,982 B2
(45) Date of Patent: *Nov. 26, 2013

(54) HIGHLY REFINED FIBER MASS, PROCESS OF THEIR MANUFACTURE AND PRODUCTS CONTAINING THE FIBERS

(75) Inventors: Brock Lundberg, Roberts, WI (US); Dale C. Lindquist, Willmar, MN (US)

(73) Assignee: Fiberstar Bio-Ingredient Technologies, Inc., River Falls, WI (US)

( * ) Notice: Subject to any disclaimer, the term of this patent is extended or adjusted under 35 U.S.C. 154(b) by 1067 days.

This patent is subject to a terminal disclaimer.

(21) Appl. No.: 11/204,895

(22) Filed: Aug. 16, 2005

(65) Prior Publication Data
US 2005/0274469 A1    Dec. 15, 2005

Related U.S. Application Data

(62) Division of application No. 10/288,793, filed on Nov. 6, 2002, now Pat. No. 7,094,317.

(51) Int. Cl.
*A23L 1/0534* (2006.01)
*A23L 1/2165* (2006.01)

(52) U.S. Cl.
USPC .................................. 426/615; 426/616

(58) Field of Classification Search
USPC ............................... 426/615, 616
See application file for complete search history.

(56) References Cited

U.S. PATENT DOCUMENTS

| | | | |
|---|---|---|---|
| 4,374,702 A | 2/1983 | Turbak et al. | 162/100 |
| 4,413,017 A | 11/1983 | Loader | 426/616 |
| 4,560,527 A * | 12/1985 | Harke et al. | 264/500 |
| 4,773,965 A * | 9/1988 | Glinski et al. | 162/9 |
| 4,923,981 A * | 5/1990 | Weibel et al. | 536/56 |
| 5,817,381 A | 10/1998 | Chen et al. | 428/34.8 |
| 5,964,983 A | 10/1999 | Dinand et al. | 162/27 |
| 6,083,582 A | 7/2000 | Chen et al. | 428/34.8 |
| 6,231,913 B1 | 5/2001 | Schwimmer et al. | 426/605 |
| 2002/0060382 A1 | 5/2002 | Luo et al. | 264/555 |
| 2005/0233044 A1 | 10/2005 | Rader et al. | 426/573 |

FOREIGN PATENT DOCUMENTS

| | | |
|---|---|---|
| EP | 0 102 829 A1 | 3/1984 |
| WO | WO 9415484 A1 * | 7/1994 |
| WO | WO 01/32978 A1 | 5/2001 |

OTHER PUBLICATIONS

Gu et al., Structure-Function Relationships of Highly Refined Cellulose, 2001, American Society of Agricultural Engineers ISSN 0001-2351 vol. 44(6):1707-1712.*
Herbafood Press Report: Improved Fruit Fibres for Modern Food Processing. Herbafood Ingredients GmbH May/Jun./2001.

* cited by examiner

*Primary Examiner* — Jyoti Chawla
(74) *Attorney, Agent, or Firm* — Mark A. Litman & Associates, P.A.

(57) ABSTRACT

The present invention comprises an improved method for refining cellulose that produces a highly refined cellulosic material. The method comprises soaking raw material from primarily parenchymal cell wall structures in an aqueous solution which need not contain an agent to modify the fiber (e.g., a mild alkalizing or alkaline agent and/or solution) using reduced temperatures and pressures, and refining the material with a plate refiner so that a waste water stream is reduced in volume. The mass is dried to produce the HRC fiber. The HRC fiber displays a water retention capacity of about 25 to at least about 56 g $H_2O$/g dry HRC and retains moisture under conditions that are ordinarily used to remove moisture from materials. The highly refined fiber product can also provide excellent thickening properties and can be used in a wide variety of materials, including edible materials.

20 Claims, 2 Drawing Sheets

HIGHLY REFINED FIBER MASS, PROCESS OF THEIR MANUFACTURE AND PRODUCTS CONTAINING THE FIBERS

RELATED APPLICATION DATA

This Application is a division of U.S. patent application Ser. No. 10/288,793, filed Nov. 6, 2002, titled "HIGHLY REFINED FIBER MASS, PROCESS OF THEIR MANUFACTURE AND PRODUCTS CONTAINING THE FIBERS."

BACKGROUND OF THE INVENTION

1. Field of the Invention

The present invention relates to the manufacture of compositions from cellulose fiber material, the fiber based product, and products containing the fiber based product.

2. Background of the Art

Many food and agricultural byproducts contain substantial amounts of cellulose. Cellulose is known to be useful in a wide range of markets. The food industry uses cellulose as a fat replacement, a component in products such as dietary fiber supplements, suspension agents, emulsifiers, water binding agents, as well as for edible films and coatings. The pharmaceutical industry uses cellulose as a component in bulking agents and dietary fibers for treatment and prevention of coronary heart disease, Type II diabetes, hypertension, diverticulosis, hemorrhoids, obesity, and so forth. Industrial applications of cellulose include use in filter media, latex paint, and so forth.

Native cellulose fibers contain lignin, a polymeric material found in every type of vascular plant. Prior art processes for refining cellulose seek to remove lignin before any substantive treatment of the fibers. Lignin is known to cause cellulose fibers to stick together, thus reducing the surface area available for any subsequent reactions. It is believed that the presence of lignin also reduces the ability of cellulose microfibers to intertwine and entangle, thus reducing the structural integrity and/or strength of the final product.

U.S. Published patent application 0020060382 describes a process for making lyocell fibers comprising the steps of: (a) contacting a pulp comprising cellulose and hemicellulose with an amount of a reagent sufficient to reduce the degree the of polymerization of the cellulose to the range of from about 200 to 1100 without substantially reducing the hemicellulose content of the pulp; (b) reducing the kappa number of the pulp treated in accordance with step (a) to a value less than about 2.0; and (c) forming fibers from the pulp treated in accordance with steps (a) and (b).

The process described by Turbak et al. (U.S. Pat. No. 4,374,702) for preparation of MFC from wood pulp basically involved a homogenization operation, during which wood pulp was repeatedly passed through a high pressure homogenizer until the suspension becomes a substantially stable dispersion. The homogenizer had a small diameter orifice in which the suspension was subjected to a pressure drop of at least 2000 psi and a high velocity decelerating impact against a solid surface. Homogenization is a very efficient process that converts the fibers into microfibrillated cellulose without substantial chemical change of the starting material. The term "without substantial chemical change" means the fact that the cellulosic material is not intended for uniform chemical modification, such as esterification, acidification, substituent addition, massive molecular breakdown and the like. Homogenizing primarily effects a physical size change, with only potentially modest chemical changes occurring incidentally.

Finely divided cellulose is also produced in traditional processes used in manufacturing mechanical pulp, fiberboard and paper pulp. However, these traditional processes involve the use of additional chemical treatment to available cellulose pulps, as for example, acid hydrolysis or mercerization, which chemically alter or degrade the prepared cellulose pulps. In the paper industry, it is well known that paper strength is directly related to the amount of beating or refining which the fibers receive prior to formation. However, beating and refining as practiced in the paper industry are relatively inefficient processes since large amounts of energy are expended to gain relatively minor amounts of fiber opening fibrillation.

Lignin removal from cellulose is currently accomplished using extremely high temperatures and pressures. These extreme conditions cause raw material fragments to break apart, thus releasing the desired cellulose-based micro fibers. In addition, the raw materials are subjected to high concentrations of sodium hydroxide. See, for example, U.S. Pat. No. 5,817,381 to Chen, et al. Such a process is extremely energy-intensive in terms of the required temperatures and pressures. Further, the process produces a waste stream regarded as hazardous due to elevated pH levels caused by the use of large amounts of sodium hydroxide. Treatment of the waste stream adds to the cost of production and impacts the overall efficiency of this process.

A recent improvement in that process by Lundberg et al. (U.S. patent application Ser. No. 09/432,945) comprises a method for refining cellulose, the process comprising soaking raw material in NaOH having a concentration of about five (5) to 50% (dry basis) to produce soaked raw material which steeps for about 6 hours to allow the NaOH to work, refining the soaked raw material to produce refined material, dispersing the refined material to produce dispersed refined material, and homogenizing the dispersed refined material to produce highly refined cellulose (HRC) gel having a lignin concentration of at least about one (1)% and a water retention capacity (WRC) of about 25 to at least about 56 g $H_2O$/g dry HRC. The method of the Lundberg et al invention produces a waste stream having a pH within a range of 8 to 9 and a reduced volume as compared to conventional cellulose refining processes.

In one embodiment, the method further comprises draining and washing the soaked raw material until the pH is down to about 8 to 9, bleaching the washed material at a temperature of about 20 to 100° C. in hydrogen peroxide having a concentration of about one (1) to 20% dry basis, and washing and filtering the bleached material to produce a filtered material having a solids content of about thirty percent (30%) The filtered material may be refined by being passed through a plate refiner. The plate refiner essentially breaks up the lignin as it shreds the material into refined cellulose particles. The method of that invention is asserted to be energy efficient because it does not require high pressures and temperatures as in prior art processes. Despite the presence of higher lignin concentrations in the final product, the HRC gel of the Lundberg et al invention has a water holding capacity that is at least as good or better than prior art products. Use of a plate refiner to break up the lignin rather than using high concentrations of NaOH has the added advantage of producing a non-hazardous waste stream having pH within a range of 8 to 9 and a reduced volume.

U.S. Pat. No. 6,083,582 describes a process and materials are described in which highly refined cellulose fibers are broken down into microfibers and further processed into compositions, films, coatings and solid materials which are biodegradable and even edible. The process for the formation of hardenable compositions may comprise providing a composition comprising highly refined non-wood cellulose fiber, mechanically reducing the size of the non-wood cellulose fiber to less than 2 mm, reducing the amount of binding of microfibers by lignin within said non-wood cellulose fibers present in said composition comprising cellulose fiber to form a first fiber product, providing pressure of at least 300 psi to said first fiber product while it is in the presence of a liquid, and removing said pressure within a time interval which will cause said cellulose fiber to break down into a second fiber product comprising microfibers in said liquid. The patent describes edible foodstuff wherein material having nutritional value is coated, wrapped or coated and wrapped with a film of material made from the fibers of the patent.

U.S. Pat. No. 6,231,913 describes a pre-emulsion fiber composition (i.e., the mixture formed from an oil and mixture that can be formed into an oil-in-water emulsion using standard emulsification equipment known by those of skill in the art, such as a high-pressure, ultrasonic, or other homogenizer, a rotator/stator device, and like equipment. The pressure employed, the shear rate, and/or the time of emulsification may vary widely depending upon the particular equipment employed. The pressure employed when homogenizers are used for the emulsification will generally range from about 130 psi to about 220 psi, with about 180 psi being preferred. When equipment other than homogenizers is used for the emulsification, the shear rate employed will generally range from about 9,000 to about 100,000 reciprocal seconds. The emulsification time will generally range from about 1 second to about 10 minutes, but may be higher, depending upon whether the emulsification is performed in a single pass, or in multiple passes, and will more usually range from about 2 seconds to about 30 seconds.

In spite of the improvements in cellulose fiber manufacture and properties that are provided among these various processes and materials can still be improved upon. Additionally, the processes, even if they are improved with regard to their environmental friendliness, it would be desirable if the processes could be further simplified, improved to produce more functional products, and produce fewer and less harmful by-products.

SUMMARY OF THE INVENTION

The present processes include procedures (especially drying and/or rehydrating) procedures described in greater detail herein) that have general applicability to the manufacture of highly refined cellulose fiber or particulate products. Some processes according to the present invention find particular advantages in the use of more discriminating selection of organic material (e.g., increasing the percentage of root and fruit content in the raw material to increase the percentage of parenchymal cell material as opposed to organic materials with higher proportions of sclerenchymal cell material. Raw organic material from a fruit or vegetable cell source with a substantially (at least 30%), primarily (at least 50% or at least 51%), substantively (at least 75%) or an exclusively parenchymal cell wall structure can be treated with a generally mild process to form highly absorbent microfibers. Cells from citrus fruit, carrots, grapes, tomatoes, chicory, pineapple, apples, cranberries, potatoes and sugar beets are particularly amenable to processing to generate highly refined cellulose fibers with both unique and improved properties. These exclusively parenchymal microfibers (hereinafter referred to as EPM's) have improved moisture retention and/or thickening properties that enable the fibers to provide unique benefits when combined (either in their wet form or when rehydrated from a dry form) into edible products (e.g., baked goods, liquefied foods, whipped foods, meats, meat additives or extenders (such as flour-based additives, and commercial products such as Hamburger Helper® additive products), beverages, dairy products, etc.) and in mixtures that can be used to generate edible food products (e.g., baking ingredients, dehydrated or low hydration products). The fiber materials may be provided as industrial thickeners, as in paint thickeners, stain thickeners, coating thickeners, and the like.

DETAILED DESCRIPTION OF THE INVENTION

A highly refined cellulosic materials (e.g., cellulose, modified celluloses, derivatized celluloses, hemicellulose, lignin, etc.) product can be prepared by generally moderate treatment and still provide properties that are equivalent to or improved upon the properties of the best highly refined cellulose products produced from more intense and environmentally unfriendly processes. Fruit or vegetable cells with an exclusively parenchymal cell wall structure can be treated with a generally mild process to form highly absorbent microfibers. Cells from citrus fruit and sugar beets are particularly available in large volumes to allow volume processing to generate highly refined cellulose fibers with both unique and improved properties. These exclusively parenchymal microfibers (hereinafter referred to as EPM's) have improved moisture retention and thickening properties that enable the fibers to provide unique benefits when combined into edible products (e.g., baked goods, liquefied foods, whipped foods, meats, meat fillers, dairy products, yogurt, frozen food entrees, ice cream, etc.) and in mixtures that can be used to generate edible food products (e.g., baking ingredients, dehydrated or low hydration products).

A new process for making HRC cellulose from parenchyma cell wall products, e.g. citrus fruit and sugar beets by-products, is performed in the absence of a hydroxide soaking step. This is a significant advance over the prior art as described by the Chen and Lundberg patents. Dinand, et al. (U.S. Pat. No. 5,964,983) also recommends the use of a chemical treatment step in addition to bleaching. In the present invention we are able to attain higher functionality (measured as viscosity) compared to Dinand et al. even though we use less chemical treatment, which is likely due to the higher amount of shear and chemical energy we put into the materials. The product is able to display the same or improved water retention properties and physical properties of the more strenuously refined agricultural products of the prior art, and in some cases can provide even higher water retention values, thickening and other properties that can produce unique benefits in particular fields of use.

General descriptions of the invention include a highly refined cellulose product comprising microfibers derived from organic fiber plant mass comprising at least 50% by weight of all fiber mass as parenchymal fiber mass, the highly refined cellulose product having an alkaline water retention capacity of at least about 25 g $H_2O$/g dry highly refined cellulose product and methods for providing and using these products. The highly refined cellulose product may have a water retention capacity of at least 50 g $H_2O$/g dry highly refined cellulose product.

Parenchymal cell walls refer to the soft or succulent tissue, which is the most abundant cell wall type in edible plants. For instance, in sugar beets, the parenchyma cells are the most abundant tissue the surrounds the secondary vascular tissues (xylem and phloem). Parenchymal cell walls contain relatively thin cell walls compared to secondary cell walls are tied together by pectin (Haard and Chism, 1996, Food Chemistry. Ed. By Fennema. Marcel Dekker NY, N.Y.) In secondary cell walls (xylem and phloem tissues), the cell walls are much thicker than parenchymal cells and are linked together with lignin (Smook). This terminology is well understood in the art.

As used in the practice of the present invention, the term "dry" or "dry product" refers to a mass that contains less than 15% by weight of fibers as water. The organic fiber mass comprises at least 50% by weight of fiber mass from organic products selected from the group consisting of sugar beets, citrus fruit, grapes, tomatoes, chicory, potatoes, pineapple, apple, carrots and cranberries. A food product or food additive may have at least 0.05 percent by weight solids in the food product or food additive of the above described highly refined cellulose product. The food product may also have at least about one percent or at least about two percent by weight of the highly refined cellulosic fiber of the invention.

A method for refining cellulosic material may comprise:

soaking raw material from organic fiber plant mass comprising at least 50% by weight of all fiber mass as parenchymal fiber mass in an aqueous solution with less than 1% NaOH;

draining the raw material and allowing the raw material to sit for a sufficient period under conditions (including ambient conditions of room temperature and pressure as well as accelerated conditions) so that the fibers and cells are softened so that shearing can open up the fibers to at least 40%, at least 50%, at least 60%, or at least 70, 80, 90 or 95% of their theoretic potential. This will usually require more that 4 hours soaking to attain this range of their theoretic potential. It is preferred that this soaking is for more than 5 hours, and preferably for at least about 6 hours. This soaking time is critical to get the materials to fully soften. When such a low alkaline concentration is used in the soaking, without the set time, the materials do not completely soften and can not be sheared/opened up to their full potential. This process produces soaked raw materials; and the process continues with refining the soaked raw material to produce refined material; and drying the soaked raw material.

The process may perform drying by many different commercial methods, although some display improved performance in the practice of the present invention. It is preferred that drying is performed, at least in part, by fluid bed drying or flash drying or a combination of the two. An alternative drying process or another associated drying step is performed at least in part by tray drying. For example, fluid bed drying may be performed by adding a first stream of organic fiber plant mass and a second stream of organic fiber plant mass into the drier, the first stream having a moisture content that is at least 10% less than the moisture content of the second stream or organic fiber plant mass. The use of greater differences in moisture content (e.g., at least 15%, at least 20%, at least 25%, at least 40%, at least 50% weight-to-weight water percent or weight-to-weight water-to-solid percent) is also within the scope of practice of the invention. In the drying method, the water may be extracted with an organic solvent prior to drying. In the two stream drying process, the second stream of organic fiber plant mass may have at least 25% water to solids content and the first stream may have less than 15% water to solids content. These processes may be practiced as batch or continuous processes. The method may use chopping and washing of the cellulose mass prior to soaking.

Another description of a useful process according to the invention may include draining and washing the soaked raw material in wash water to produce washed material; bleaching the washed material in hydrogen peroxide to produce a bleached material; and washing and filtering the bleached material to produce a filtered material.

The drying of an expanded fiber material according to the invention may use room temperature or higher air temperatures that dry the expanded fiber product and maintain the fiber material's functionalities of at least two characteristics of surface area, hydrogen bonding, water holding capacity and viscosity. It is also useful to use backmixing or evaporating to bring the organic fiber plant mass to a solids/water ratio that will fluidize in air in a fluid bed air dryer. This can be particularly performed with a method that uses a fluid bed dryer or flash dryer to dry the expanded or highly refined cellulosic fiber product.

The use of a flash or fluid bed dryer is an advantage over the drying methods suggested by Dinand et al., who disclose drying methods of "evaporation, dehydration, low temperature drying under controlled humidity, spray drying, drum drying, freeze drying or critical point drying, or by any other process which can obtain the product in its secondary state. Low temperature drying conditions under controlled humidity are particularly advantageous in this respect as they are gentle and energy costs are lower."

We have found that through the use of a fluid bed or flash dryer, low temperatures and controlled humidity are not needed to dry the materials of the present invention. In fact, although nearly any drying temperature in the fluid bed or flash dryer can be used, we have dried the product of the present invention using high air temperatures (400 F) and attained a dry product with near equivalent functional properties after rehydration compared to the materials before drying. Additionally, using the process of the present invention, any surface area expanded cellulosic product can be dried and a functional product obtained and is not limited to parenchyma cell wall materials. The use of a fluid bed or flash dryer, the use of relatively high drying air temperatures (400 F+), and the ability to dry non parenchyma cell wall (secondary cell) and obtain a functional product is in great contrast to the relatively low temperatures, e.g. 100 C (212 F) and dryer types taught by Dinand et al to dry expanded parenchymal cell wall materials.

The University of Minnesota patent application (Lundberg et al), describes the ability to obtain a functional dried product. However, the only way they were able to obtain a functional dry product was through freeze drying (Gu et al, 2001) .—from (Gu, L., R Ruan, P. Chen, W. Wilcke, P. Addis. 2001. *Structure Function Relationships of Highly Refined Cellulose. Transactions of the ASAE.* Vol 44(6): 1707-1712). Freeze drying is not an economically feasible drying operation for expanded cell wall products.

The fiber products of the invention may be rehydrated or partially rehydrated so that the highly refined cellulose product is rehydrated to a level of less than 90 g $H_2O$/g fiber mass, 70 g $H_2O$/g fiber mass, 50 g $H_2O$/g fiber mass or rehydrated to a level of less than 30 g $H_2O$/g fiber mass or less than 20 g $H_2O$/g fiber mass. This rehydration process adjusts the functionalities of the product within a target range of at least one property selected from the group consisting of water holding capacity, oil holding capacity, and viscosity and may include the use of a high shear mixer to rapidly disperse organic fiber plant mass materials in a solution. Also the method may include rehydration with soaking of the dry materials in a solution with or without gentle agitation.

Preferred areas of use include a bakery product to which at least 1% by weight of the organic fiber product of the invention is present in the bakery product. The process may enhance the stability of a bakery product by adding at least 1% by weight of the product of claim to the bakery product, usually in a range of from 1% to 10% by weight of the organic fiber plant mass product to the bakery product prior to baking and then baking the bakery product. This process may include increasing the storage stability of a flour-based bakery product comprising adding from 1% to 10% by weight of the highly refined organic fiber plant mass product 1 to the bakery product prior to baking and then baking the bakery product.

The basic process of the invention may be generally described as providing novel and improved fiber waste by-product from citrus fruit pulp (not the wood and stem and leaves of the trees or plant, but from the fruit, both pulp and skin) or fiber from sugar beet, tomatoes, chicory, potatoes, pineapple, apple, cranberries, grapes, carrots and the like (also exclusive of the stems, and leaves). The provided fiber mass is then optionally soaked in water or aqueous solution (preferably in the absence of sufficient metal or metallic hydroxides e.g., KOH, CaOH, LiOH and NaOH) as would raised the pH to above 9.5, preferably in the complete absence of such hydroxides (definitely less than 3.0%, less than 1.0%, more often less than 0.9%, less than 0.7%, less than 0.5%, less than 0.3%, less than 0.1%). The soaked material is then drained and optionally washed with water. This is optionally followed by a bleaching step (any bleaching agent may be used, but mild bleaching agents that will not destroy the entire physical structure of the fiber material is to be used (with hydrogen peroxide a preferred example, as well as mild chlorine bleaches). It has also been found that the bleach step is optional, but that some products require less color content and require bleaching. The (optionally) bleached material is washed and filtered before optionally being subjected to a shredding machine, such as a plate refiner which shreds the material into micro fibers. The optionally soaked, bleached, and refined material is then optionally dispersed, and homogenized at high pressure to produce HRC gel.

The HRC dispersion of the present invention is a highly viscous, semi-translucent gel. HRC embodiments comprise dried powders that are redispersable in water to form gel-like solutions. The functional characteristics of HRC are related to various properties, including water- and oil-retention capacity, average pore size, and surface area. These properties inherently relate to absorption characteristics, but the properties and benefits provided by the processes and products of the invention seem to relate to additional properties created in the practice of the invention.

The present invention also includes an aqueous HRC gel having a lignin concentration of about one to twenty percent (1 to 20%). The HRC products of the present invention exhibit a surprisingly high WRC in the range of about 20 to at least about 56 g $H_2O$/g dry HRC. This high WRC is at least as good as, and in some cases, better than the WRC of prior art products having lower or the same lignin concentrations. The HRC products exhibit some good properties for ORC (oil retention capacity).

A general starting point for a process according to the invention is to start with raw material of sufficiently small size to be processed in the initial apparatus (e.g., where soaking or washing is effected), such as a soaker or vat. The by-product may be provided directly as a result of prior processing (e.g., juice removal, sugar removal, betaine removal, or other processing that results in the fiber by-product. The process of the present invention may also begin when raw material is reduced in size (e.g., chopped, shredded, pulverized) into pieces less than or equal to about 10×5 cm or 5 cm×2 cm. Any conventional type of manual or automated size reduction apparatus (such as chopper, shredder, cutter, slicer, etc.) can be used, such as a knife or a larger commercially-sized chopper. The resulting sized raw material is then washed and drained, thus removing dirt and unwanted foreign materials. The washed and chopped raw material is then soaked. The bath is kept at a temperature of about 20 to 100° C. The temperature is maintained within this range in order to soften the material. In one embodiment, about 100 g of chopped raw material is soaked in a 2.5 liter bath within a temperature range of about 20 to 80 degrees Centigrade for 10 to 90 minutes.

The resulting soaked raw material is subjected to another washing and draining. This washing and additional washing and draining tend to be more meaningful for sugar beets, potatoes, carrots (and to some degree also tomatoes, chicory, apple, pineapple, cranberries, grapes, and the like) than for citrus material. This is because sugar beets, potatoes, carrots, growing on the ground rather than being supported in bushes and trees as are citrus products, tend to pick up more materials from the soil in which they grow. Sugar beets and carrots tend to have more persistent coloring materials (dyes, pigments, minerals, oxalates, etc.) and retained flavor that also are often desired to be removed depending upon their ultimate use. In one embodiment, the soaked raw material is washed with tap water. In one other embodiment, the material is drained. This is optionally followed by bleaching the material with hydrogen peroxide at concentrations of about one (1) to 20% (dry basis) peroxide. The bleaching step is not functionally necessary to effect the citrus and grape fiber conversion to highly refined cellulose. With respect to carrots and sugar beets, some chemical processing may be desirable, although this processing may be significantly less stressful on the fiber than the bleaching used on corn-based HRC products. From our experience, some chemical step is required for sugar beets, and bleaching is one option. Using alkaline pretreatment baths is another option. Acid treatment or another bleaching agent are other options.

The material is optionally bleached at about 20 to 100° C. for about five (5) to 200 min. The bleached material is then subjected to washing with water, followed by filtering with a screen. The screen can be any suitable size. In one embodiment, the screen has a mesh size of about 30 to 200 microns.

The filtered material containing solids can then be refined (e.g., in a plate refiner, stone mill, hammer mill, ball mill, or extruder). In one embodiment, the filtered material entering the refiner (e.g., a plate refiner) contains about four percent (4%) solids. In another embodiment, the refining can take place in the absence of water being added. The plate refiner effectively shreds the particles to create microfibers. The plate refiner, which is also called a disk mill, comprises a main body with two ridged steel plates for grinding materials. One plate, a refining plate, is rotated while a second plate remains stationary. The plates define grooves that aid in grinding. One plate refiner is manufactured by Sprout Waldron of Muncy, Pa. and is Model 12-ICP. This plate refiner has a 60 horsepower motor that operates at 1775 rpm.

Water may be fed into the refiner to assist in keeping the solids flowing without plugging. Water assists in preventing the refiner's plates from overheating, which causes materials in the refiner to burn. (This is a concern regardless of the type of grinding or shearing device used). The distance between the plates is adjustable on the refiner. To set refining plate distances, a numbered dial was affixed to the refining plate adjustment handle. The distance between the plates was measured with a micrometer, and the corresponding number on the dial was recorded. Several plate distances were evaluated and the setting number was recorded. A variety of flow consistencies were used in the refiner, which was adjusted by varying solids feed rate. The amount of water flowing through the refiner remained constant. Samples were sent through the refiner multiple times. In one embodiment the materials are passed one or more times through the plate refiner.

The microfibers may then be separated with a centrifuge to produce refined materials. The refined materials are then diluted in water until the solids content is about 0.5 to 37%. This material is then dispersed. In one embodiment, dispersing continues until a substantially uniform suspension is obtained, about 2 to 10 minutes. The uniform suspension reduces the likelihood of plugging.

The resulting dispersed refined materials, i.e., microparticles, may then be homogenized in any known high pressure homogenizer operating at a suitable pressure. In one embodiment, pressures greater than about 5,000 psi are used. The resulting highly refined cellulose (HRC) gel may display a lignin content of about 1 to 20% by weight, depending in part upon its original content.

The absence of use of a mild NaOH soaking before the refining step in the present invention prior to high pressure homogenization does not require the use of high temperature and high pressure cooking (high temperature means a temperature above 100 degrees C. and high pressure means a pressure above 14 psi absolute). High temperature and high pressure cooking may be used, but to the disadvantage of both economics and output of the product. This novel process further avoids the need for either mild concentrations of NaOH or of highly concentrated NaOH and the associated undesirable environmental impact of discharging waste water containing any amount of NaOH and organic compounds. The process also avoids a need for an extensive recovery system. In one embodiment, the pH of the discharge stream in the present invention is only about 8 to 9 and may even approach 7. The method of the present invention has the further advantage of reducing water usage significantly over prior art processes, using only about one third to one-half the amount of water as is used in conventional processes to produce to produce HRC gel and amounts even less than that used in the Chen processes All of the mechanical operations, refining, centrifuging, dispersing, and homogenizing could be viewed as optional, especially in the case of citrus pulp or other tree bearing fruit pulps. Additionally, other shearing operations can be used, such as an extruder, stone mill, ball mill, hammer mill, etc. For citrus pulp, the only processes that are needed to produce the expanded cell structure are to dry (using the novel drying process) and then properly hydrate the raw material prior to the expanding and shearing step of the process of the invention. This simple process could also be used in other raw material sources.

Hydration is a term that means reconstituting the dried fiber back to a hydrated state so that it has functionality similar to the pre-dried material. Hydration can be obtained using various means. For instance, hydration can occur instantly by placing the dry products in a solution followed by shearing the mixture. Examples of shearing devices are a high shear disperser, homogenizer, blender, ball mill, extruder, or stone mill. Another means to hydrate the dry materials is to put the dry product in a solution and mix the materials for a period of time using gentle or minimal agitation. Hydrating dry materials prior to use in a recipe can also be conducted on other insoluble fibrous materials to enhance their functionality.

The initial slurry of fibers/cells from the EPM products is difficult to dry. There is even disclosure in the art (e.g., U.S. Pat. No. 4,413,017 and U.S. Pat. No. 4,232,049) that slurries of such processed products cannot be easily dried without expensive and time consuming processes (such as freeze drying, extended flat bed drying, and the like). Freeze drying is effective, but is not economically and/or commercially desirable. Similarly, tray dryers may be used, but the length of time, labor and energy requirements make the process costly. The slurries of the citrus and/or beet by-products may be dried economically and effectively according to the following practices of the invention. Any type of convective drying method can be used, including a flash dryer, fluid bed dryer, spray dryer, etc. One example of a dryer that can be used is a fluid bed dryer, with dry material being added to the slurry to equilibrate the moisture content in the materials. It has been found that by adding 5:1 to 1:1 dry to wet materials within the fluid bed drier improves the air flow within the drier and the material may be effectively dried. In the absence of the combination of "dry" and "wet" materials, the slurry will tend to merely allow air to bubble through the mass, without effective drying and without a true fluid bed flow in the drier. The terms wet and dry are, of course, somewhat relative, but can be generally regarded as wet having at least (>40% water/<60% solid content] and dry material having less than 20% water/ 80% solid content). The amounts are not as critical as the impact that the proportional amounts of materials and their respective water contents have in enabling fluid flow within the fluid bed drier. These ranges are estimates. It is always possible to use "wet" material with lower moisture content, but that would have to have been obtained by an earlier drying or other water removal process. For purpose of economy, and not for enabling manufacture of HRC microfibers according to the present invention from citrus or beet by-product, it is more economical to use higher moisture content fiber mass as the wet material. After the mixture of wet and dry materials have been fluid bed dried (which can be done with air at a more moderate temperature than is needed with flat bed dryers (e.g., room temperature air with low RH may be used, as well as might heated air). A flash drier may also be used alternatively or in combination with a fluid bed drier to effect moisture reduction from the citrus or beet by-product prior to produce a functional dry product. It would be necessary, of course, to control the dwell time in the flash drier to effect the appropriate amount of moisture reduction and prevent burning. These steps may be provided by the primary or source manufacturer, or the product may be provided to an intermediate consumer who will perform this drying step to the specification of the process that is intended at that stage.

One aspect of the drying process is useful for the drying of any expanded cellulose products, especially for the drying of highly refined cellulose fibers and particles that have been extremely difficult or expensive to dry. Those products have been successfully dried primarily only with freeze drying as a commercially viable process. That process is expensive and energy intense. A method according to the present invention for the drying of any expanded cellulose fiber or particle product comprises drying an expanded cellulose product by providing a first mass of expanded cellulose fiber product having a first moisture content as a weight of water per weight of fiber solids; providing a second mass of expanded cellulose fiber product having a second moisture content as a weight of water per weight of fiber solids, the second moisture content being at least 20% less than said first moisture content; combining said first mass of expanded cellulose fiber product and said second mass of expanded cellulose product to form a combined mass; drying said combined mass in a drying environment to form a dried combined mass. The method may have the dried combined mass dried to a moisture content of less than 20, less than 10, less than 8, less than 5 or less than 3 $H_2O$/g fiber mass. The method, by way of non-limiting examples, may use drying environments selected from the group consisting of, flash driers, fluid bed driers and combinations thereof.

The rehydration and shearing (particularly high shearing at levels of at least 10,000 $sec^{-1}$, preferably at least 15,000 $sec^{-1}$, more often, greater than 20,000, greater than 30,000, greater than 40,000, and conveniently more than 50,000 $sec^{-1}$ (which is the actual shearing rate used in some of the examples) of the dry fiber product enables the resultant sheared fiber to retain more moisture and to retain moisture more strongly. It has been noted in the use of materials according to the practice of the invention that when the fiber products of the invention are rehydrated, the water activity level of rehydrated fiber is reduced in the fiber (and the fiber present in a further composition) as compared to free water that would be added to the further composition, such as a food product. The food products that result from cooking with 0.1 to 50% by weight of the HRC fiber product of the invention present has been found to be highly acceptable to sensory (crust character, flavor/aroma, grain/texture, taste, odor, and freshness, especially for mixes, frozen foods, baked products, meat products and most particularly for bakery goods, bakery products, and meat products) tests on the products. Importantly, the products maintain their taste and mouth feel qualities longer because of the higher moisture retention. The high water absorbency and well dispersed nature of the product also lends itself to be an efficient thickening agent/suspending agent in paints, salad dressings, processed cheeses, sauces, dairy products, meat products, and other food products.

Donuts, breads, pastry and other flour products that are deemed freshest when they are moist, tend to retain the moisture and their sensory characteristics compatible with freshness longer with the inclusion of these fibers. In bakery products, the loaf volume maintains the same with the addition of the product of the present invention.

In another embodiment, the HRC products of the present invention possess a WRC and ORC that are at least as good as or even better than prior art products (including the Chen product) with regard to the water retention characteristics and the strength of that retention. This is true even though the products of the present invention may have a higher lignin concentration than products made using conventional processes and are dried (and the same amount as the Lundberg patents products). It is assumed that the lignin which is present has been substantially inactivated to a sufficient degree so that the undesirable clumping does not subsequently occur. Another reason for these improved properties may be due to a porous network structure that is present in the HRC products of the present invention, but is lost in prior art products due to high concentration soaking in NaOH, and which may be slightly reduced even with the mild NaOH solutions used by the Lundberg patents.

A number of unexpected properties and benefits have been provided by the highly refined cellulose microfiber product of the present invention derived from parenchymal cell material. These products are sometimes referred to herein as "exclusively parenchymal cell wall structures." This is indicative of the fact that the majority source of the material comes from the cell structures of the plants that are parenchymal cells. As noted earlier, the HRC microfibers of the invention are not produced by mild treatment of the leaves, stems, etc. of the plants (which are not only parenchymal cell wall structures, but have much more substantial cell structures). This does not mean that any source of citrus or beet cells and fibers used in the practice of the present invention must be purified to provide only the parenchymal cells. The relative presence of the more substantive cells from leaves and stems will cause approximately that relative proportion of cell or fiber material to remain as less effective material or even material that is not converted to HRC, but will act more in the nature of fill for the improved HRC microfibers of the present invention. It may be desirable in some circumstances to allow significant portions of the more substantive cells and fibers to remain or even to blend the HRC (citrus or beet parenchyma based) product of the present invention with HRC fibers of the prior art to obtain particularly desired properties intermediate those of the present invention and those of the prior art. In the primary manufacturing process of the invention (that is, the process wherein the cells that have essentially only parenchymal cell walls are converted to HRC microfibers or particles according to the mild treatment process of the present invention), the more substantive cells and fibers may be present in weight proportions of up to fifty percent (50%). It is preferred that lower concentrations of the more substantive fibers are present so as to better obtain the benefit of the properties of the HRC fibers of the present invention, so that proportions of cells having exclusively parenchymal cell walls in the batch or flow stream entering the refining process stream constitute at least 50%, at least 60%, at least 70%, at least 80%, at least 90%, at least 95%, at least 97%, at least 98%, at least 99% or preferable about 100% of the fibrous or cellular material added to the refining flow stream. The final fiber product should also contain approximately like proportions of the HRC product of the present invention with regard to other HRC additives or fiber additives.

Among the unexpected properties and benefits of the HRC materials of the present invention derived from the mild refinement of cells and fiber from citrus and beet by-product are the fact of the HRC fibers, the stability of HRC fibers from parenchymal cells, the high water retention properties, the strength of the water retention properties of the fibers, the ability of the HRC fibers to retain water (moisture) even when heated, the ability of the HRC fibers to retain water (moisture) on storage, and the ability of the HRC fibers to retain moisture in food stuff without promoting degradation, deterioration or spoilage of the food as compared to food stuff with similar concentrations of moisture present in the product that is not bound by HRC fibers. The ability of the fiber materials of the present invention to retard moisture migration is also part of the benefit. This retarded water migration and water activity of water retained or absorbed by the fibers of the invention may be related to the previously discussed binding activity and binding strength of water by the fiber. As the moisture is retained away from other ingredients that are more subject to moisture-based deterioration, the materials of the invention provide significant benefits in this regard. These benefits can be particularly seen in food products (including baked goods such as breads, pastries, bars, loaves, cakes, cookies, pies, fillings, casseroles, protein salads (e.g., tuna salads, chicken salads), cereals, crackers, meats, processed dairy products, processed cheese, entrees and the like) that are stored as finished products either frozen, refrigerated, cooked, or at room temperature in packaging. The HRC fiber of the present invention may be provided as part of a package mix that can be used by the consumer, with the HRC fibers remaining in the final product to provide the benefits of the invention in the product finished (baked or cooked) by the consumer. The HRC fiber materials of the present invention provide other physical property modifying capabilities in the practice of the invention. For example, the fibers can provide thickening properties, assist in suspending or dispersing other materials within a composition, and the like. These properties are especially present in HRC fibers of the invention provided from sugar beets.

The percentage of fiber in the final product that is desirable to provide identifiable benefits is as low as 0.01% or 0.05% or 0.1% of the total dry weight of the final product. The HRC fiber product of the invention may be used as from 0.05 to 50% by weight of the dry weight of the product, 0.5 to 40%, 1 to 40%, 1 to 30%, 1 to 25%, 1 to 20%, 1 to 15%, 1 to 10%, and 2 to 20% by weight of the dry weight of the final product.

An unexpected property is for the finished dried product to have a viscosity in a 1% solution of 1000-300,000 centipoise at 0.5 rpms when measured using a Brookfield LVDV++ viscometer (Middleboro, Mass.). An additional unexpected property is for the end processed product to have similar rheology curves as other common hydrocolloids, such as xanthan gum. The expanded fiber products of the invention are highly effective and environmentally safe viscosity enhancers. In addition, they are quite useful in edible products, in addition to the functional benefits they add to edible products such as beverages, cheeses, baked goods, liquid and semi-liquid products (stews, soups, etc.).

The invention will be further described by reference to the following example which is offered in order to further illustrate the present invention and the advantages thereof. This example is in no way meant to be limiting, but merely illustrative.

EXAMPLES

Example 1

Figure 1:
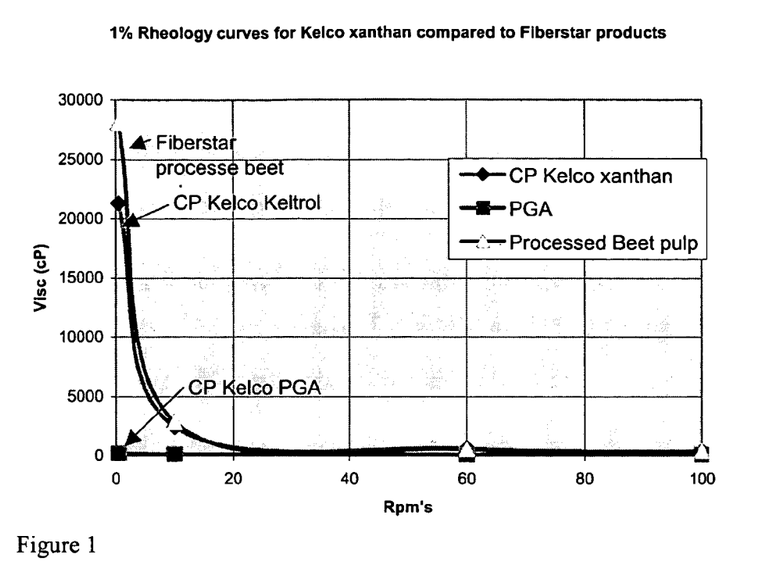
FIG. 1 shows a graphic comparison of rheology curves for Fiberstar's processed beet pulp versus xanthan and PGA (propylene glycol alginate).
Figure 2:
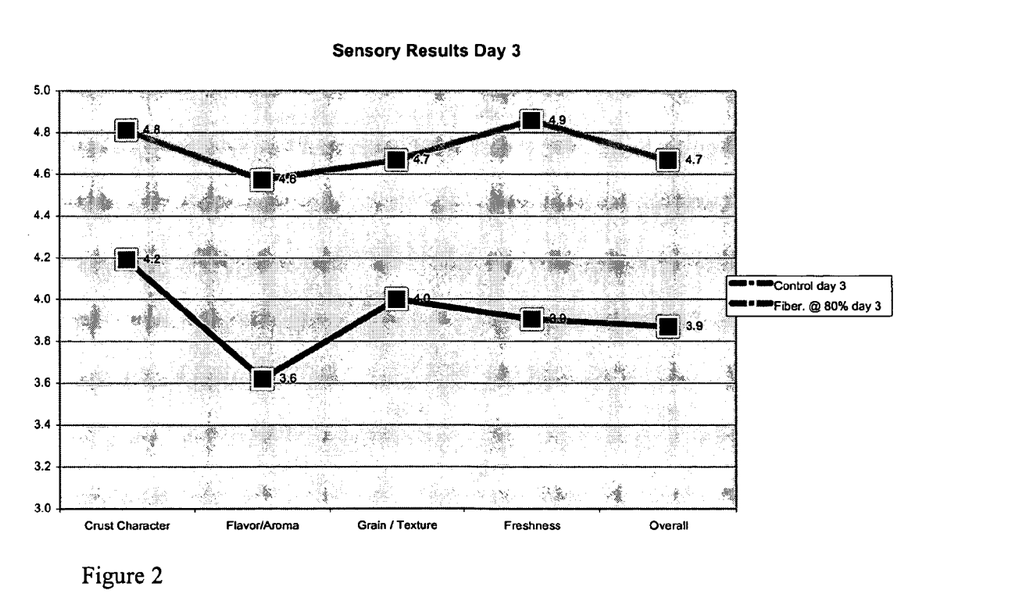
FIG. 2 shows a scholastic graphic comparison of qualities of baked goods after three days comparing goods with and without processed citrus pulp materials of the present invention.
Figure 3:
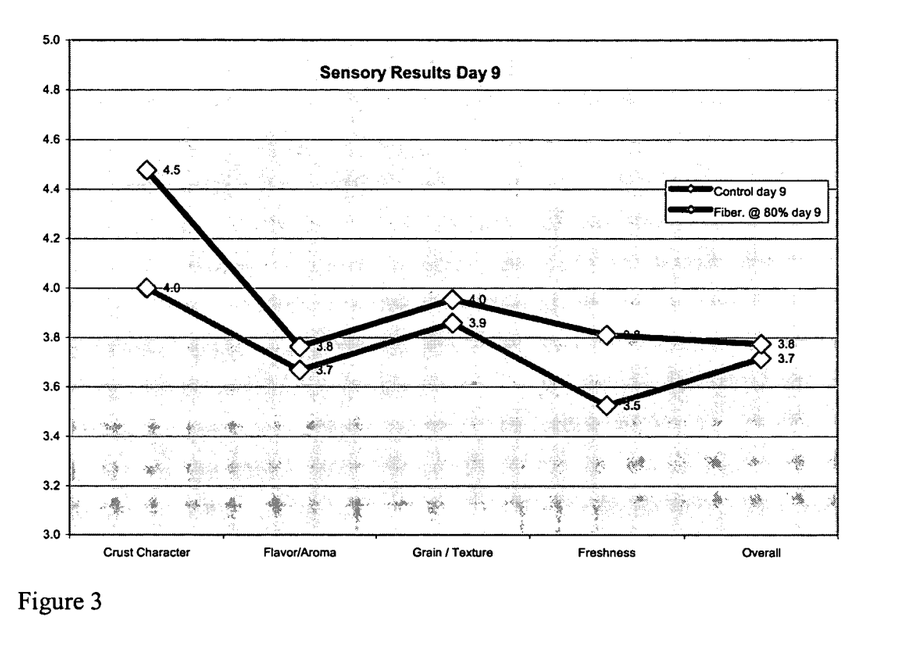
FIG. 3 shows a scholastic graphic comparison of qualities of baked goods after nine days comparing goods with and without processed citrus pulp materials of the present invention.

Dried beet pulp shreds were obtained from a local feed store. The beet pulp was then ground to a powder using a disk mill or refiner. One particularly useful plate refiner is manufactured by Sprout Waldron of Muncy, Pa. and is Model 12-ICP. This plate refiner has a 60 horsepower motor that operates at 1775 rpm. After the dry materials were ground, they were soaked in hot water at 100° C. for 5 minutes at 5% solids, where the materials started to absorb moisture. The soaked materials were then washed with water in a screen cart to remove any unwanted particulate or soluble materials. After soaking, the materials were diluted to 3% solids and bleached in a 150 gal tank with agitation. The bleaching conditions were 15% hydrogen peroxide (based on dry matter weight), a pH of 11.5, and a temperature of 80° C. for one hour. After bleaching, the material was then washed in a screen cart. After bleaching, the materials were then refined again at 3% solids using the same refiner in the first step, which was followed by further reducing particle sizes in an IKA Dispax Reactor, Model DR 3-6A (Wilmington, N.C.). The dispersed materials were then homogenized three times at 8000 psi (approximately $5 \times 10^5$ sec$^{-1}$ shear rate) using a APV Gaulin high pressure homogenizer, Model MC(P)-45 (Wilmington, Mass.). The homogenized materials were then dried at 120° F. in a Harvest Saver Dehydrator made by Commercial Dehydrator Systems (Eugene, Oreg.). The dried materials were then ground in a Fitzmill, Model D6 (Elmhurst, Ill.), with a 0.050 inch round 22 gauge 316 stainless steel screen. After grinding, the ground materials were then rehydrated at 1% solids using a standard kitchen household blender on high speed for three minutes. Viscosity was then measured using a Brookfield LVDV++ viscometer (Middleboro, Mass.) with cylindrical spindles. Keltrol xanthan and propylene glycol alginate (PGA) were obtained from CP Kelco. 1% solutions were made by mixing the materials in a blender for 3 minutes. Rheology was determined using the same Brookfield viscometer. The results are shown in FIG. 1. This data shows that the fibers of the invention are capable of providing a viscosity of at least 23,000 at a concentration of 1% fibers derived from sugar beets at 1 rpm at 20° C. It is within the skill of the artisan using the teachings of this invention to provide viscosities of greater than 24,000 and greater than 25,000 at these concentrations and conditions to produce the parenchymal cell based highly refined cellulose fibers of the invention. This is evidence by FIG. 1.

FIG. 1: Comparison of rheology curves for Fiberstar's processed beet pulp versus xanthan and PGA (propylene glycol alginate).

Citrus Examples 2-6

Example 2

Frozen washed orange pulp cells were obtained from Vita Pakt (Covina, Calif.). Hot water was added to the frozen pulp to thaw the pulp. After thawing, the materials were dewatered on a screen to remove any excess water and bring the solids content to 5%. The thawed and screened materials were refined using a Sprout Waldron disk mill (Muncy, Pa.), Model 12-ICP. The refined materials were then dispersed at 5% solids at 50,000 sec$^{-1}$ shear rate using an IKA Dispax™ Reactor, Model DR 3-6A (Wilmington, N.C.). Viscosity was then measured using a Brookfield LVDV++ viscometer (Middleboro, Mass.) with cylindrical spindles.

Example 3

Frozen washed orange pulp cells were obtained from Vita Pakt™ (Covina, Calif.). Hot water was added to the frozen pulp to thaw the pulp. After thawing, the materials were dewatered on a screen to remove any excess water and produce a pulp with a 5% solids content. The thawed and screened materials were refined at 5% solids using a Sprout Waldron disk mill (Muncy, Pa.), Model 12-ICP. The refined materials were then dispersed using an IKA Dispax™ Reactor, Model DR 3-6A (Wilmington, N.C.) at 5% solids. The dispersed materials were then homogenized one time at 8000 psi using an APV Gaulin high pressure homogenizer, Model MC(P)-45 (Wilmington, Mass.) at 5% solids. Viscosity was then measured using a Brookfield LVDV++ viscometer (Middleboro, Mass.) with cylindrical spindles.

Example 4

Frozen washed orange pulp cells were obtained from Vita Pakt™ (Covina, Calif.). Hot water was added to the frozen pulp to thaw the pulp. After thawing, the materials were dewatered on a screen to remove any excess water and produce a pulp with a 5% solids content. The thawed and screened materials were refined at 5% solids using a Sprout Waldron disk mill (Muncy, Pa.), Model 12-ICP. The refined materials were then dispersed using an IKA Dispax™ Reactor, Model DR 3-6A (Wilmington, N.C.) at 5% solids. The dispersed materials were then homogenized one time at 8000 psi (approximately 5×10⁵ sec⁻¹ shear rate) using an APV Gaulin high pressure homogenizer, Model MC(P)-45 (Wilmington, Mass.) at 5% solids. The homogenized materials were then dried at 70° F. in a Harvest Saver™ Dehydrator made by Commercial Dehydrator Systems (Eugene, Oreg.). The dried materials were then ground in a Fitzmill, Model D6 (Elmhurst, Ill.), with a 0.050 inch round 22 gauge 316 stainless steel screen. After grinding, the ground materials were then rehydrated at 1% solids using a standard kitchen household blender on high speed for three minutes. Viscosity was then measured using a Brookfield LVDV++ viscometer (Middleboro, Mass.) with cylindrical spindles.

Example 5

Frozen washed orange pulp cells were obtained from Vita Pakt™ (Covina, Calif.). Hot water was added to the frozen pulp to thaw the pulp. After thawing, the materials were dewatered on a screen to remove any excess water and produce a pulp with a 5% solids content. These materials were then put in a blender on high speed for 3 minutes (approximately 30,000 to 40,000 sec⁻¹ shear rate) and the viscosity was then measured using a Brookfield LVDV++ viscometer (Middleboro, Mass.) with cylindrical spindles.

Example 6

Frozen washed orange pulp cells were obtained from Vita Pakt™ (Covina, Calif.). Hot water was added to the frozen pulp to thaw the pulp. After thawing, the materials were dewatered on a screen to remove any excess water and produce a pulp with a 5% solids content. The thawed materials were then dried at 70° F. in a Harvest Saver Dehydrator made by Commercial Dehydrator™ Systems (Eugene, Oreg.). The dried materials were then ground in a Fitzmill, Model D6 (Elmhurst, Ill.), with a 0.050 round 22 gauge 316 stainless steel screen. After grinding, the ground materials were then rehydrated at 1% solids using a standard kitchen household blender on high speed for three minutes (approximately 30,000 to 40,000 sec⁻¹ shear rate). Viscosity was then measured using a Brookfield LVDV++ viscometer (Middleboro, Mass.) with cylindrical spindles.

Table showing viscosities of citrus pulp cells after various treatment conditions,.

| Example # | Solids % | Viscosity (cP) | |
|---|---|---|---|
| | | 0.5 rpm | 10 rpm |
| 2) | 1% | 15207 | 1428 |
| 3) | 1% | 15477 | 1966.5 |
| 4) | 1% | 8728 | 587.5 |
| 5) | 1% | 15117 | 1608 |
| 6) | 1% | 10275 | 999 |

Example 7

Dry Product Rehydration Using Production Size Equipment

Quadro™ (Milburn, N.J.) [rehydrated dry orange pulp product at 3% solids and ran the mixture through their Model Z3 emulsifier various times. As shown in the following table, one pass through their emulsifier is more effective than rehydrating by shearing 3.5 minutes in a blender. With this style machine, our product is fed into the disperser feeder, where it drops into the water stream, gets hydrated, and goes directly to the ingredient mix without the need for an allocated dispersing tank and can be sized to rehydrate on a large production scale.

Table showing viscosity (3% solids) for various passes through a high shear emulsifier] vs a kitchen blender.

| Shearing Method | Viscosity (cP), 3% | | | | |
|---|---|---|---|---|---|
| | 0.5 rpm | 10 rpm | 60 rpm | 100 rpm | 200 rpm |
| Disp, 1 pass | 25,375 | 1,923 | 405 | 260.1 | 138.5 |
| Disp, 2 passes | 36,172 | 1,668 | 473 | 335 | 191 |
| Disp, 3 passes | 35,512 | 1776 | 525 | 340 | 185.1 |
| Blender, 3.5 min | 17,396 | 1617 | 321.9 | 218.4 | 138 |

Example 8

Dried citrus peel and/or beet fiber products commonly sold today for a fiber source can also be processed and produce a functional product. A dry ground citrus peel product was obtained from Vita Pakt™ (Covina, Calif.). The dry ground citrus peel was then dispersed at 3% solids using an IKA Dispax™ Reactor, Model DR 3-6A (Wilmington, N.C.) at 5% solids. The dispersed materials were then homogenized one time at 8000 psi using an APV Gaulin high pressure homogenizer, Model MC(P)-45 (Wilmington, Mass.). Viscosity was then measured using a Brookfield LVDV++ viscometer (Middleboro, Mass.) with cylindrical spindles.

| Method | Viscosity (cP), 3% | | | | |
|---|---|---|---|---|---|
| | 0.5 rpm | 10 rpm | 60 rpm | 100 rpm | 200 rpm |
| Dry product in water | <10 | <10 cP | <10 cP | <10 cP | <10 Cp |
| Dry product after shearing | 1666 | 213 | 65 | 44 | 29 |

Example 9

Fluid Bed Drying

Fluid bed drying trials were performed using a Carrier Vibrating Equipment (Louisville, Ky.) a one square (foot vibrating fluid bed dryer. Dry products were attained having functionality that was near identical to the wet feed materials. The drying tests were conducted using 100-140° F. outlet air temperatures, 400° F. air inlet temperatures, and residence times in the dryer were around 5-25 minutes. All materials that underwent drying were dried to less than 15% moisture. All viscosities were measured at 1% using a Brookfield LVDV++ viscometer (Middleboro, Mass.) with cylindrical spindles. Prior to drying, the wet materials need to be back mixed (that is wetter materials are added to the drier materials to facilitate drying of the wetter materials) with the dry materials (backmix ratio was 2 parts dry to 1 part wet) and a total of 6 lbs of wet feed was put in the batch style dryer. The results from the testing are shown below:

| Drying Conditions | Moisture % | Viscosity (cP), 1% | | | | |
|---|---|---|---|---|---|---|
| | | 0.5 rpm | 10 rpm | 60 rpm | 100 rpm | 200 rpm |
| Feed material | 39.5 | 5020 | 577 | 220 | 155 | 87 |
| 400 F. drying air | 12.2 | 5929 | 515 | 178 | 145 | 80 |

Example 10

Flash Drying

Pilot scale Flash drying trials were performed using a Carrier Vibrating Equipment (Louisville, Ky.) Tornesh dryer. Prior to drying, the wet materials (dispersed orange pulp, as from Example 2) were to be back mixed with the dry materials, again orange pulp from Example 2 (backmix ratio was 2 parts dry to 1 part wet) and a total of 30 lbs of 50% moisture wet feed was put in the dryer. Dry products were attained having functionality that was similar to the wet feed materials. The drying tests were conducted using 200° F. outlet air temperatures and residence times in the dryer were around 1-3 minutes. The dried materials were rehydrated using a blender on high speed for 3 minutes and all viscosities were measured at 1% using a Brookfield LVDV++ viscometer (Middleboro, Mass.) with cylindrical spindles. The results from the testing are shown below:

Table showing results of flash drying trials.

| Drying Conditions | Moisture % | Viscosity (cP), 1% | | | | |
|---|---|---|---|---|---|---|
| | | 0.5 rpm | 10 rpm | 60 rpm | 100 rpm | 200 rpm |
| Feed material | 39.5 | 5020 | 577 | 220 | 155 | 87 |
| Flash dried feed materials (400 F. air) | 13.9 | 4232 | 368 | 134 | 88 | 53 |

Example 11

The wet feed materials can also be dried using solvents to displace the water as opposed to driving off water. The advantage of the solvent drying method is that the materials will release their water once a sufficient amount of solvent is added, which is advantageous because the water can then be mechanical squeezed out as opposed to being evaporated in a dryer. Homogenized beet pulp samples were prepared in following the same process in Example 1, except not all of materials were dried using the procedure outlined in Example 1. Sample 1 was dried using the Harvest Saver™ Dehydrator made by Commercial Dehydrator Systems (Eugene, Oreg.). Sample 2 was dried by mixing in 1 parts acetone to 1 part of homogenized materials, which was followed by screening to remove any excess liquid. A second acetone extraction step was done again using 1 part acetone to 1 part of the screened material and this again was screened to remove any excess liquid. The acetone extracted materials were then ready for drying, which was completed by putting the samples on a try and blowing room temperature air over the materials. This acetone extracted and dried material is noted as Sample 2 in the Table below. The same procedure used for the acetone extraction was completed except isopropanol was used instead of acetone. This sample was also dried and labeled Sample 3 in the Table below. The dried materials were then ground in a Fitzmill, Model D6 (Elmhurst, Ill.), with a 0.050 inch round 22 gauge stainless steel screen. After grinding, the ground materials were then rehydrated at 1% solids using a standard kitchen household blender on high speed for three minutes. Viscosity was then measured using a Brookfield LVDV++ viscometer (Middleboro, Mass.) with cylindrical spindles.

Table showing solvent drying results:

| Material Description | Brookfield Viscosity (cP) | | |
|---|---|---|---|
| | 0.5 | 10 rpm | 200 rpm |
| 1) Homogenized beet pulp w/out solvent drying | 40,210 | 1502 | 271 |
| 2) Homogenized beet pulp using acetone to extract the water | 23,612 | 1239 | 203 |
| 3) Homogenized beet pulp using isopropanol to extract the water | 39,832 | 1662 | 318 |

Example 11

Using a 2% (baker's percent) of the hydrated expanded fiber (the citrus fiber obtained in Example 6) in a basic bread recipe, the amount of water that can be added to the bread is significantly more (13-15% more water absorption points) without causing a negative effect on the dough or bread physical characteristics, such as loaf volume or dough rheology. Additionally, the increased water that can be added to the bread significantly enhances the sensory characteristics after 3 days and after 9 days, as the graphs shown below indicate. The sensory results were obtained using a 21 member sensory panel. All loaves were frozen prior to the sensory evaluation and were pulled out of the freezer at staggered dates so that all the sensory evaluations could take place at the same time. For example, the 1 day shelf life test was pulled out 1 day before the sensory test day and the 3 days shelf life test was pulled out 3 days before the sensory test day. The results show that the bread made with the fiber and extra water had a significantly higher sensory score than the control. Additionally, the results show that the overall sensory of the bread made with the fiber at 9 days have a similar sensory score as the control after 3 days.

HRC Sample Preparation

The prior art HRC samples were prepared from staring with orange pulp from Vita Pakt (Covina, Calif.), which are a byproduct resulting from orange juice manufacture (U.S. patent application Ser. No. 09/432,945) lists only corn stover in the examples. There is no suggestion or disclosure of sugar beets or citrus using this corn stover process. The sugar beets would come out okay using this process (with additional costs associated with the additional steps), but the citrus pulp made by this Lundberg process would give us an extremely low yield. The same is also true if the Chen process was used but the yields and functionality would even be much lower for both materials. Specifically, about 2000 g of 5% solids orange pulp were provided as small pieces (e.g., less than 5 cm in any dimension). The small pieces were then soaked 25 gNaOH-solutions for at least about 1 hour. After soaking, the material was drained and was allowed to sit for about 6 hours. The soaked material was then washed with tap water. One batch was bleached with hydrogen peroxide (according to the teachings in the Lundberg patent) and another batch was not bleached. Refining of the bleached material was performed with a commercial refiner. The refined material was then diluted to about 1% solids and was dispersed for about 5 to 10 minutes. High-pressure homogenization of the dispersed material was accomplished using a conventional homogenizer. A portion of each of the resulting batches of HRC gel was freeze-dried and another portion of each of the batches (bleached and unbleached) was flash dried. Freeze dried HRC samples were prepared using a freeze drying apparatus, model RVT 4104-120 from Savant Instrument Inc. The samples were dried at −180° C. and zero (0) mmHg vacuum.

Prior art results according to the Chen patents were WRC values were measured for both the aqueous HRC gel and dried HRC powder using NaOH concentrations ranging from about 0.004 to 0.025 g NaOH/g water. The WRC values for both the HRC gel and HRC powder were in the range of about 20 to at least about 56 g $H_2O$/g dry HRC, depending on the concentration of the alkaline solutions. Maximum WRC values for the gel of at least about 56 g $H_2O$/g dry HRC were obtained with a NaOH concentration of about 0.007 g NaOH/g $H_2O$. Drying the HRC gel resulted in a reduction of about three (3) to 15% in WRC, which may be attributed to structural damages such as recrystallization caused by dehydration. However, the HRC powder also exhibited high WRC values, having a maximum WRC value of at least about 56 g $H_2O$/g dry HRC at a NaOH concentration of about 0.007 g NaOH/g $H_2O$. Compared with WRC values for even earlier prior art HRC products of 3.5 to 10 g water/g dry powdered cellulose reported by Ang and Miller in Cereal Foods World, *Multiple Functions of Powdered Cellulose as a Food Ingredient*, Vol. 36 (7): 558-564 (1991), it was shown that both the HRC gel and powder of the Chen patents had a much higher water-holding capacity than prior art materials known at the time of the invention.

Determination of Water-Retention Capacity (WRC) and Oil-Retention Capacity (ORC)

WRC is a measure of the amount of water retained under standard centrifuge. The WRC values for both aqueous HRC gel and freeze-dried HRC were determined in accordance with Method 56-10 of the American Association of Cereal Chemists (AACC), except the water holding capacities were measured in a 1% hydrated state. In the ORC (oil retention capacity) test, the same procedure was used except oil was used instead of water.

Determination of Pore Size and Microsurface Area

Both the pore size and the microsurface area of freeze-dried HRC samples were measured using a Micromeritics™ 2000 from Micromeritice Instrument Co. The test sample was weighed with a precision of 0.0001 g. In all cases, the test sample weight was more than 100 mg to reduce the effect of weighing errors. At 85° C. and 6 mmHg vacuum, the sample was degassed, and moisture and other contaminants were removed. The degassed sample was analyzed in a nitrogen gas environment. Average pore diameter, BET surface area and Langmuir surface area were measured. The BET surface area values were determined by calculating the monolayer volume of adsorbed gas from the isotherm data. The Langmuir surface area values were obtained by relating the surface area to the volume of gas adsorbed as a monolayer.

Results and Discussion

Pore Size and Surface Area

Average pore size is a measure of openness of the HRC structure. FIG. 4 shows that the average pore size increased rapidly as NaOH concentration was increased to 0.007%, then slowly with further increase in NaOH concentration. The surface area reached a maximum value at 0.007% NaOH, which also coincides with the maximum WRC discussed above. The decrease in surface area after the maximum value seems to suggest an increase in the ratio of large pores to small pores, which may contribute to the decrease in total surface area.

In one embodiment, the process of the present invention removes lignin to a sufficient degree or substantially inactivates it such that undesirable fiber clumping does not occur There is not a large apparent difference in terms of WHC/visc between the two products (the Chen product and the product of the invention) in a wet form, but there is a significant and commercially and technically important difference between the products/processes is that 1) Chen never provided a method for drying the gel product or 2) rehydrating the dry product. Additionally, 3) the present process for citrus has no required chemical treatment and does not need any mechanical treatments to produce a dry product that rehydrates to a high WHC/viscosity g el. Additionally, there is less concern about all the surface area, and pore size measurements.

Certain general characteristics of materials have been recognized in University studies, although methods for producing alternative or improved products were not suggested or known. For instance, Gu (Lin Gu, MS Thesis, University of Minnesota, 2000) shows a direct relationship between surface area and water holding capacity. In other words, Gu suggests an increase in surface area will directly correspond to an increase in water holding capacity. Also, Lundberg (B. Lundberg, MS Thesis, University of Minnesota, 2000) shows and suggests a direct relationship between water holding capacity and viscosity of HRC; meaning the higher the water holding capacity is, the higher the viscosity. Thus, viscosity, which was measured in this application, is thought to directly relate to the water holding capacity and surface area.

It is to be appreciated that the method and product of the present invention have been described in particular detail with respect to preferred processes and formulations. The present invention, however, is not intended to be limited to these preferred embodiments. One skilled in the art will readily recognize that the actual method and product may be adjusted to accommodate particular conditions.

What is claimed is:

1. A process of rehydrating a highly refined cellulose product comprising microfibers derived from organic fiber citrus plant mass comprising at least 30% by weight of fiber mass as parenchymal fiber mass in complete absence of refinement process introduced metal or metallic hydroxides or NaOH soaking, the highly refined cellulose product having a water retention capacity of at least about 20 g H20/g dry highly refined cellulose product wherein the highly refined cellulose product is rehydrated to a level of less than 60 g H20/g fiber mass.

2. The process of claim 1 wherein the highly refined cellulose product is rehydrated to a level of less than 30 g $H_2O$/g fiber mass.

3. The process of claim 1 wherein the highly refined cellulose product is rehydrated to a level of less than 20 g $H_2O$/g fiber mass.

4. The process of claim 1 wherein the amount of rehydration performed adjusts the functionalities of the product within a target range of at least one property selected from the group consisting of water holding capacity, oil holding capacity, and viscosity.

5. The process of claim 1 wherein rehydrating includes the use of a high shear mixer to rapidly disperse organic fiber plant mass materials in a solution.

6. The process of claim 1, wherein rehydrating includes soaking the dry materials in a solution with or without gentle agitation.

7. The process of claim 1 wherein the highly refined cellulose product comprises microfibers derived from organic plant mass comprising at least 30% by weight of all fiber mass as parenchymal fiber mass, the highly refined cellulose product displaying a viscosity at a 1% weight concentration in water at 1 revolution per minute of at least 20,000 centipoise at 20° C.

8. A method for refining high parenchymal cellulosic fiber mass material from comprising:
   soaking raw material from organic fiber plant mass comprising at least 30% by weight of fiber mass as parenchymal fiber mass in an aqueous solution in complete absence of refinement process introduced metal or metallic hydroxides;
   draining the raw material and allowing the raw material to sit for sufficient time to enable cells in the raw material to open cells and expand the raw material, the soaking producing soaked raw materials;
   exercising shear of at least 10,000 sec−1 on the soaked raw material to produce refined material; and,
   without a bleaching step, drying the soaked raw material by a process comprising at least one of fluid bed drying and flash drying to form a dried product.

9. A method of making a bakery product by adding at least 1% by weight of the dried product of claim 8 to the bakery product before baking the bakery product and then baking the bakery product.

10. A method of enhancing the stability of a bakery product comprising adding from 1% to 10% by weight of the dried product of claim 8 to the bakery product prior to baking and then baking the bakery product before baking the bakery product and then baking the bakery product.

11. A method of drying an expanded cellulose product comprising:
   providing a first mass of expanded, sheared cellulose fiber product which is free of refinement process introduced metal or metallic hydroxides and comprises at least 30% by weight of fiber mass as parenchymal fiber mass having parenchymal cell wall structures having a first moisture content as a weight of water per weight of fiber solids;
   providing a second mass of expanded, sheared cellulose fiber product which is free of refinement process introduced metal or metallic hydroxides and comprises at least 30% by weight of fiber mass as parenchymal fiber mass having a second moisture content as a weight of water per weight of fiber solids, the second moisture content being at least 20% less than said first moisture content;
   combining said first mass of expanded: sheared cellulose fiber product and said second mass of expanded, sheared cellulose product to form a combined mass;
   drying said combined mass in a drying environment to form a dried combined mass which is a dried powder redispersible in water.

12. The method of claim 11 wherein the drying environment is selected from the group consisting of flash driers fluid bed driers and combinations thereof.

13. The method of claim 11 wherein said dried combined mass is dried to a moisture content of less than 20 $H_2O$/g fiber mass.

14. The method of claim 13 wherein the drying environment is selected from the group consisting of flash driers, fluid bed driers and combinations thereof.

15. A method of making an expanded fiber mass material friable so that it can be dried in a convective style dryer, the process comprising
   providing a first mass of moist, fiber material which is free of refinement process introduced metal or metallic hydroxides and comprises at least 30% by weight of fiber mass as parenchymal fiber mass having a first moisture content and providing a second mass of moist fiber material which is free of refinement process introduced metal or metallic hydroxides and comprises at least 30% by weight of fiber mass as parenchymal fiber mass having a second moisture content that is at least 10% less than the moisture content of the first mass of moist fiber material as measured in g H20/g fiber solids;
   combining the first mass and the second mass to form a combined high parenchymal content fiber mass;
   providing the combined mass within a drying environment; and drying the combined mass to improve the drying rate of the first mass of moist fiber in forming a dried fiber mass which is a dried powder redispersible in water.

16. The method of claim 15 wherein a mixer mixes the first mass of moist fiber with the second mass of moist fiber.

17. The method of claim 15 wherein the second mass of moist fiber has less than 20% $H_2O$ compared to the weight of fiber solids in the second mass of moist fiber.

18. A process of rehydrating a highly refined cellulose product comprising microfibers derived from organic fiber citrus plant mass comprising at least 30% by weight of fiber mass as parenchymal fiber mass which is free of refinement process introduced metal or metallic hydroxides and which is a dried powder redispersible in water, the highly refined cellulose product having a water retention capacity of at least about 20 g H20/g dry highly refined cellulose product wherein the highly refined cellulose product is rehydrated to a level of less than 60 g H20/g fiber mass wherein the organic fiber mass comprises at least 50% by weight of fiber mass from organic products selected from the group consisting of sugar beets, citrus fruit, carrots, grapes, tomatoes, chicory, potatoes, pineapple, apples, and cranberries and wherein at least 80% of the organic mass is derived from fruit and root cells.

19. The process of claim 18 wherein the organic fiber mass comprises at least 50% by weight of fiber mass derived from the group consisting of sugar beets, citrus fruit and grapes.

20. The process of claim 18 wherein the organic fiber mass comprises at least 50% by weight of fiber mass derived from the group consisting of citrus fruit and grapes.

* * * * *